US012505776B2

(12) United States Patent
Kim et al.

(10) Patent No.: US 12,505,776 B2
(45) **Date of Patent: *Dec. 23, 2025**

(54) DUAL COLOR MANAGEMENT FOR A MULTI-PIXEL DENSITY DISPLAY

(71) Applicant: Google LLC, Mountain View, CA (US)

(72) Inventors: Hyunchul Kim, San Jose, CA (US); Wonjae Choi, San Jose, CA (US); Sun-il Chang, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/759,610

(22) Filed: Jun. 28, 2024

(65) Prior Publication Data

US 2024/0355254 A1 Oct. 24, 2024

Related U.S. Application Data

(63) Continuation of application No. 17/774,386, filed as application No. PCT/US2019/064686 on Dec. 5, 2019, now Pat. No. 12,051,353.

(51) Int. Cl.
*G09G 3/20* (2006.01)

(52) U.S. Cl.
CPC ... *G09G 3/2003* (2013.01); *G09G 2320/0242* (2013.01); *G09G 2320/0686* (2013.01); *G09G 2340/06* (2013.01)

(58) Field of Classification Search
CPC ... G09G 2320/0242; G09G 2320/0686; G09G 2340/06; G09G 3/2003; G09G 5/06; G09G 2340/0407; G09G 3/32
See application file for complete search history.

(56) References Cited

U.S. PATENT DOCUMENTS 10,062,183 B2 * 8/2018 Klement ............... G06T 11/001
10,957,239 B2 3/2021 Greenebaum et al.
(Continued)

FOREIGN PATENT DOCUMENTS

CN 101458907 6/2009
CN 103108205 5/2013
(Continued)

OTHER PUBLICATIONS

Office Action in Chinese Appln. No. 201980102258.3, mailed on Nov. 7, 2024, 20 pages (with English translation).
(Continued)

*Primary Examiner* — Ricardo Osorio
(74) *Attorney, Agent, or Firm* — Fish & Richardson P.C.

(57) ABSTRACT

Methods, systems, and apparatus, including computer programs encoded on a computer storage medium, for dual color management for a multi-pixel density display. In one aspect, the method includes obtaining an image to be shown on a display, where the display includes both a first area that has a first pixel density and a second area that has a second pixel density that is less than the first pixel density, determining that a pixel with an initial value in the image will be displayed in the first area of the display, in response to determining that a pixel with the initial value in the image will be displayed in the first area of the display, determining a remapped value for the pixel in the image based on the initial value and a lookup table for the first area, and providing the remapped value for output on the display.

16 Claims, 4 Drawing Sheets

(56) References Cited

U.S. PATENT DOCUMENTS

| | | | | |
|---|---|---|---|---|
| 11,024,260 | B2 * | 6/2021 | Greenebaum | G09G 5/10 |
| 11,030,971 | B2 | 6/2021 | Lee et al. | |
| 11,120,726 | B2 | 9/2021 | Zhao et al. | |
| 12,051,353 | B2 * | 7/2024 | Kim | G09G 3/32 |
| 2004/0223173 | A1 | 11/2004 | Arai et al. | |
| 2004/0246268 | A1 | 12/2004 | Nair et al. | |
| 2006/0007239 | A1 | 1/2006 | Harrison | |
| 2012/0169790 | A1 | 7/2012 | Broughton et al. | |
| 2013/0076776 | A1 | 3/2013 | Glen et al. | |
| 2014/0168185 | A1 | 6/2014 | Han | |
| 2017/0212717 | A1 | 7/2017 | Zhang | |
| 2018/0089861 | A1 | 3/2018 | Klement et al. | |
| 2020/0105226 | A1 | 4/2020 | Greenebaum | |
| 2020/0111401 | A1 | 4/2020 | Zhao et al. | |
| 2020/0234634 | A1 | 7/2020 | Li | |

FOREIGN PATENT DOCUMENTS

| | | |
|---|---|---|
| CN | 105304003 | 2/2016 |
| CN | 106782428 | 5/2017 |
| CN | 107633824 | 1/2018 |
| CN | 108648679 | 10/2018 |
| CN | 108766347 | 11/2018 |
| CN | 109074234 | 12/2018 |
| CN | 109448644 | 3/2019 |
| CN | 110009643 | 7/2019 |
| CN | 209056269 | 7/2019 |
| CN | 111294649 | 6/2020 |
| EP | 3331236 | 6/2018 |
| WO | WO 2015130793 | 9/2015 |
| WO | WO 2019219063 | 11/2019 |

OTHER PUBLICATIONS

International Preliminary Report on Patentability in International Appln. No. PCT/US2019/064686, mailed on Jun. 16, 2022, 16 pages.

International Search Report and Written Opinion in International Appln. No. PCT/US2019/064686, mailed on Sep. 24, 2020, 25 pages.

Invitation to Pay Additional Fees in International Appln. No. PCT/US2019/064686, mailed on Aug. 3, 2020, 9 pages.

Office Action in Chinese Appln. No. 201980102258.3, mailed on Mar. 18, 2024, 24 pages (with English translation).

Office Action in European Appln. No. 19828125.5, mailed on Dec. 13, 2023, 12 pages.

Office Action in Chinese Appln. No. 201980102258.3, mailed on Apr. 1, 2025, 33 pages (with English Machine translation).

Office Action in European Appln. No. 19828125.5, mailed on Mar. 14, 2025, 15 pages.

Office Action in European Appln. No. 19828125.5, mailed on Dec. 4, 2024, 14 pages.

Office Action in European Appln. No. 19828125.5, mailed on May 2, 2025, 21 pages.

* cited by examiner

DUAL COLOR MANAGEMENT FOR A MULTI-PIXEL DENSITY DISPLAY

CROSS-REFERENCE TO RELATED APPLICATION

This application is continuation of U.S. patent application Ser. No. 17/774,386, filed May 4, 2022, which is a National Stage Application under 35 U.S.C. § 371 and claims the benefit of International Application No. PCT/US2019/064686, filed on Dec. 5, 2019. The disclosure of the prior applications are considered part of and are incorporated by reference in the disclosure of this application.

BACKGROUND

Electronic devices can include display panels.

SUMMARY

This specification describes techniques, methods, systems, and other mechanisms for dual color management for a multi-pixel density display. A multi-pixel density display may be used so that a camera may be placed behind an area of the display that has a lower pixel density so that the display causes less degradation in quality of images captured by the camera compared to placing the camera behind an area of the display with higher pixel density.

For example, the display may have more open spaces in the area that has lower pixel density so that light that passes through the display in that area undergoes less interference (e.g., attenuation, diffraction and/or scatter) than light that passes through the display in an area with higher pixel density. Similarly, various sensors such as an ambient light sensor, depth sensor, or some other sensor may additionally or alternatively be placed behind the area with lower pixel density to reduce interference caused by the display.

However, an area with lower pixel density may appear to be dimmer than a higher pixel density area because there are fewer pixel emitting light. In order to keep luminance of the lower pixel density region similar to the higher pixel density region, the luminance of each pixel in the lower pixel density region may need to be increased. The luminance of a pixel may be increased by increasing driving current.

However, pixels of a display may have different color responses at different driving currents. For example, an organic light emitting diode (OLED) display may produce different colors with different driving currents. Accordingly, a multi-pixel density OLED display may show different color responses for the same image content if a driving current is increased to increase brightness. For example, an image that should be pink may be displayed across the areas so that it is pink in a higher pixel density area but orange in a lower pixel density area.

To overcome this problem, a system may use dual color management for a multi-pixel density display. A first color management may be used for a higher pixel density area and a second, different color management may be used for a lower pixel density area. For each pixel of an image to be displayed, the system may determine in which pixel density area that the pixel of the image will be displayed, and then use the corresponding color management for that pixel density area. With this system, an image that should be pink may be displayed across the areas so that it is pink in a higher pixel density area and pink in a lower pixel density area while the portions of the image shown in both areas also have the same luminance.

In general, one innovative aspect of the subject matter described in this specification can be embodied in a method that includes the actions of obtaining an image to be shown on a display, where the display includes both a first area that has a first pixel density and a second area that has a second pixel density that is less than the first pixel density, determining that a pixel with an initial value in the image will be displayed in the first area of the display, in response to determining that a pixel with the initial value in the image will be displayed in the first area of the display, determining a remapped value for the pixel in the image based on the initial value and a lookup table for the first area, and providing the remapped value for output on the display.

Other embodiments of this aspect include corresponding circuitry, computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. In some aspects, providing the remapped value for output on the display includes determining a second remapped value for the pixel in the image based on the initial value and a lookup table for the second area and selecting the remapped value instead of the second remapped value based on determining that the pixel with the initial value in the image will be displayed in the first area of the display.

In certain aspects, determining a remapped value for the pixel in the image based on the initial value and a lookup table for the first area includes determining the remapped value as a combination of an output of a red table with entries of pairs of an input of red, green, blue (RGB) values and an output of a remapped red value, an output of a blue table with entries of pairs of an input of red, green, blue (RGB) values and an output of a remapped blue value, and an output of a green table with entries of pairs of an input of red, green, blue (RGB) values and an output of a remapped green value. In some implementations, determining a remapped value for the pixel in the image based on the initial value and a lookup table for the first area includes determining a XYZ color space value from the initial value and determining a RGB color space value as the remapped value from the XYZ color space value and the lookup table for the first area.

In some aspects, actions include determining that a second pixel with the initial value in the image will be displayed in the second area of the display, in response to determining that the second pixel with the initial value in the image will be displayed in the second area of the display, determining a second remapped value for the second pixel in the image based on the initial value and a lookup table for the second area, where the second remapped value is different than the remapped value, and providing the second remapped value for output on the display.

In certain aspects, actions include determining that a second pixel with a second initial value in the image will be displayed in the first area of the display, in response to determining that a second pixel with a second initial value in the image will be displayed in the first area of the display, determining a second remapped value for the second pixel in the image based on the initial value and the lookup table for the first area, where the second remapped value is different than the remapped value, and providing the second remapped value for output on the display. In some implementations, the lookup table for the first area includes a table of entries, where each entry includes a pair of an initial value as an input and a remapped value as an output.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
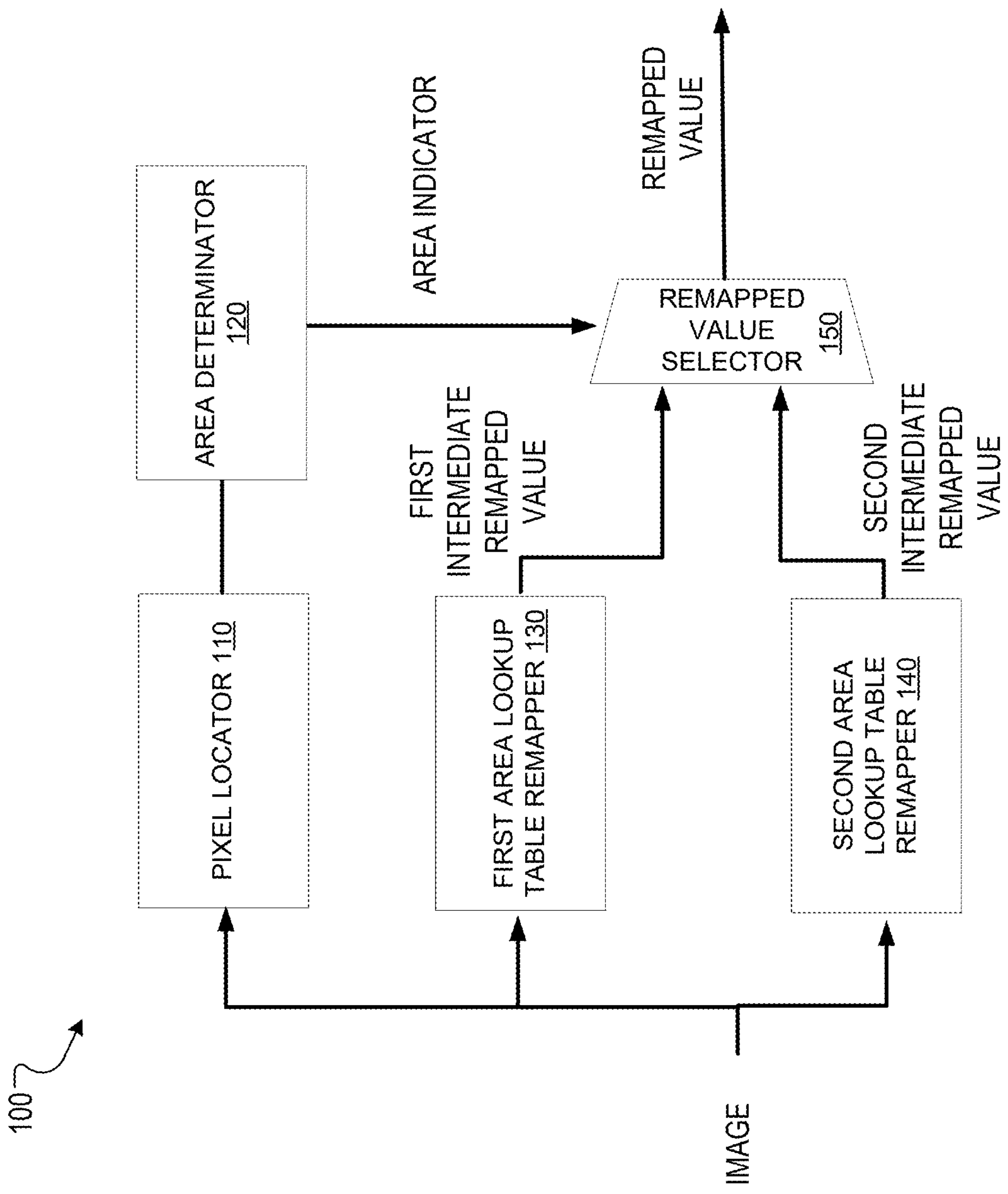
FIGS. 1A-1C are block diagrams of an example system that uses dual color management for a multi-pixel density display.
Figure 1B:
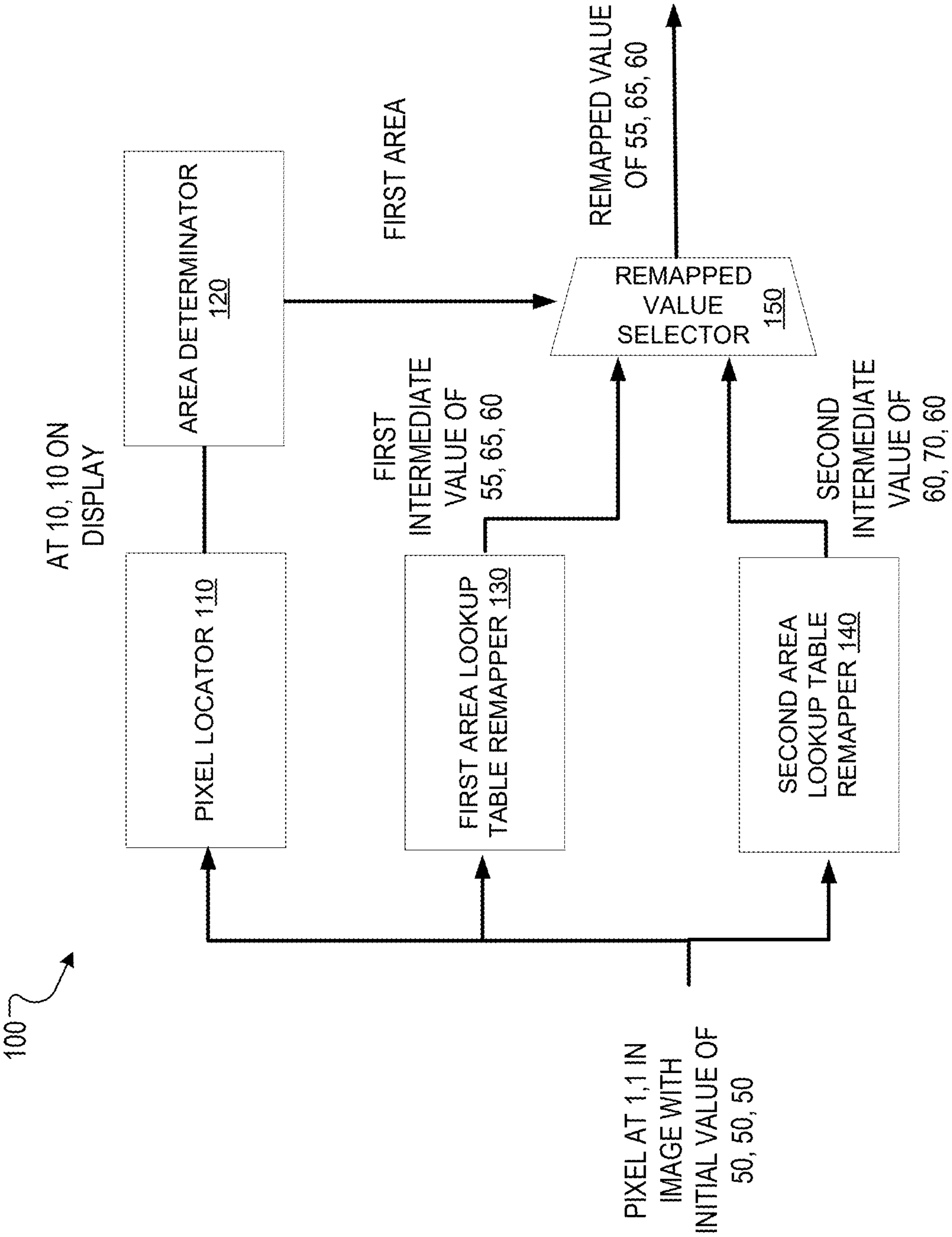
Figure 1C:
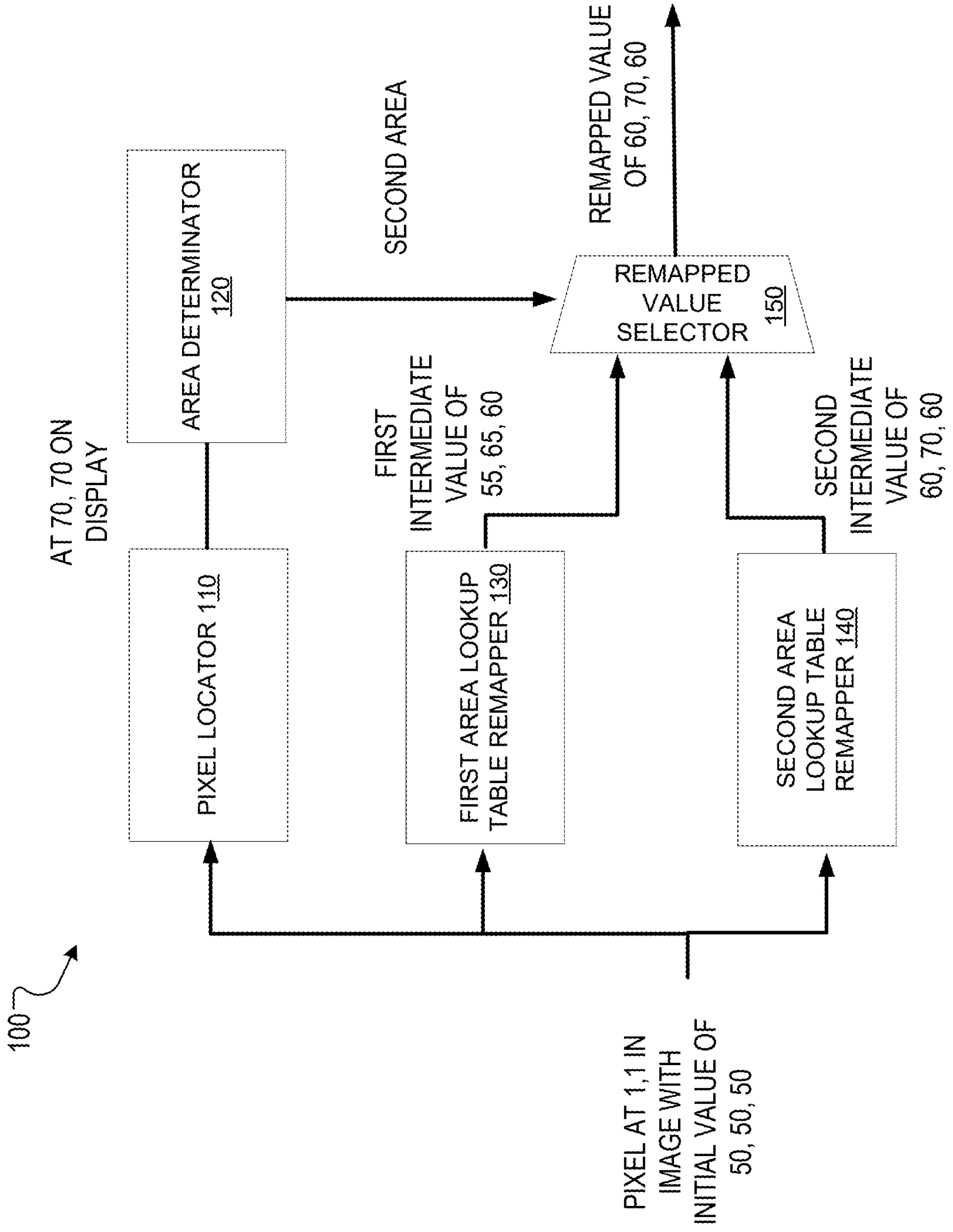

FIGS. 1A-1C are block diagrams of an example system that uses dual color management for a multi-pixel density display. The system 100 includes a pixel locator 110, an area determinator 120, a first area lookup table remapper 130, second area lookup table remapper 140, and a remapped value selector 150.

The pixel locator 110 may determine a location where a pixel of an image will be displayed on the multi-pixel density display. For example, the pixel locator 110 may determine that a pixel at a location of 1,1 in an image may be displayed at a location of 10, 10 on the display. 1,1 may refer to an x and y coordinate, where x is horizontal counting up from left to right and y is vertical counting up from top to bottom. The multi-pixel density display may include two or more areas with different pixel densities. For example, the display may include a first area with a pixel density of four hundred pixels per square inch that surrounds a second area with a pixel density of two hundred pixels per square inch.

The pixel locator 110 may determine the location where a pixel in an image will be displayed on the display based on determining in which pixels of the display the image will be displayed, and then determining in which areas of the display that the determined pixels are located. For example, as shown in FIG. 1B, the pixel locator may determine that an image may be shown with an upper left corner at 10,10 on the display so determine the pixel at 1,1 in the image will be displayed at 10,10 on the display. In another example, as shown in FIG. 1C, the pixel locator may determine that an image may be shown with an upper left corner at 70,70 on the display so determine the pixel at 1,1 in the image will be displayed at 70,70 on the display.

The area determinator 120 may determine in which pixel density area the pixel of the display that was located by the pixel locator 110 is located. For example, as shown in FIG. 1B, the determinator 120 may determine that 10,10 on the display is located in the first area. For example, as shown in FIG. 1C, the determinator 120 may determine that 70,70 on the display is located in the second area.

The area determinator 120 may determine in which pixel density area the pixel of the display is located based on stored data that indicates where each of the areas is located. For example, the area determinator 120 may store data that indicates that the first area covers an area with an upper left corner at 1,1 of the display and a lower right corner at 60,90 of the display and the second area covers an area with an upper left corner at 61,1 of the display and a lower right corner at 90,90 of the display.

The first area lookup table remapper 130 may remap an initial value of a pixel to a first intermediate value. For example, as shown in FIG. 1B, the remapper 130 may remap a value of 50,50,50 to 55,65,60. The initial value and the first intermediate value may be a red, green, blue (RGB) values in a RGB color space. For example, 55 may represent a red value, 65 may represent a green value, and 60 may represent a blue value.

The remapper 130 may remap an input value from the image to the first intermediate value based on a first lookup table. The first lookup table may include input values and paired corresponding output values. For example, the first lookup table may include an entry with an input value of 50,50,50 and an output value of 55,65,60.

In some implementations, the first lookup table may include a red table, a green table, and a blue table, where each table in the red table includes an entry with an input for each possible combination of RGB value and an output for a corresponding remapped red value, each table in the green table includes an entry with an input for each possible combination of RGB value and an output for a corresponding remapped green value, and each table in the blue table includes an entry with an input for each possible combination of RGB value and an output for a corresponding remapped blue value.

The second area lookup table remapper 140 may remap an initial value of a pixel to a second intermediate value. For example, as shown in FIG. 1B, the remapper 140 may remap a value of 50,50,50 to 60,70,60. The second intermediate value may be a RGB value in a RGB color space. For example, 60 may represent a red value, 70 may represent a green value, and 60 may represent a blue value.

Similarly as to the remapper 130, the remapper 140 may remap an input value from the image to the second intermediate value based on a second lookup table. The second lookup table may be structured similarly to the first lookup table in having various entries. However, the second lookup table includes at least some different output values than the first lookup table. For example, the first lookup table may include an entry with an input of 50,50,50 and an output of 55,65,60, and the second lookup table may include an entry with an input of 50,50,50 and an output of 60,70,60.

The remapped value selector 150 may receive the area indicator, the first intermediate remapped value, and the second intermediate remapped value, and select one of the intermediate remapped values as the remapped value to display based on the area indicator. For example as shown in FIG. 1B, the remapped value selector 150 may receive, for a pixel at location 1,1 in an image, an indication from the area determinator 120 that content in the pixel is to be displayed in the first area, a first intermediate remapped value of 55,65,60 from the first lookup table remapper 130, and a second intermediate remapped value of 60,70,60 from the second lookup table remapper 140, and select the first intermediate remapped value of 55,65,60 as the remapped value to display as the content in the pixel is indicated as to be shown in the first area.

In another example as shown in FIG. 1C, the remapped value selector 150 may receive, for a pixel at location 1,1 in an image, an indication from the area determinator 120 that content in the pixel is to be displayed in the second area, a first intermediate remapped value of 55,65,60 from the first lookup table remapper 130, and a second intermediate remapped value of 60,70,60 from the second lookup table remapper 140, and select the second intermediate remapped value of 60,70,60 as the remapped value to display as the content in the pixel is indicated as to be shown in the second area.

The operations described above for the pixel locator 110, the area determinator 120, the remapper 130, the remapper 140, and the remapped value selector 240 may be performed for each pixel in the image. For example, the operations described above for the pixel locator 110, the area determinator 120, the remapper 130, the remapper 140, and the remapped value selector 240 may be performed sequentially first for a pixel at location 0,0 in the image, then a pixel at location 0,1 in the image, then a pixel at location 0,2 in the image, etc. until values specified for pixels in the image are remapped.

In another example, the operations described above for the pixel locator 110, the area determinator 120, the remapper 130, the remapper 140, and the remapped value selector 240 may be performed in parallel for a pixel at location 0,0, a pixel at location 0,1, and a pixel at location 0,2, etc. for all locations of pixels in the image.

In some implementations, functionality of the pixel locator 110, the area determinator 120, the remapper 130, the remapper 140, and the remapped value selector 240 may be combined or further distributed. For example, the functionality of the pixel locator 110 may be performed by the area determinator 120.

The remapped value output from the system 100 may be provided to a driver integrated circuit that is configured to receive remapped values and provide voltage to pixels in a display. For example, the remapped value of 55,65,60 may result in a particular driving current being provided to a pixel in the display panel. The driver integrated circuit may receive other control factors that affect the final driving current output based on a remapped value, such control factors including display brightness control, display uniformity calibration, color calibration, and pattern loading effect control.

Figure 2:
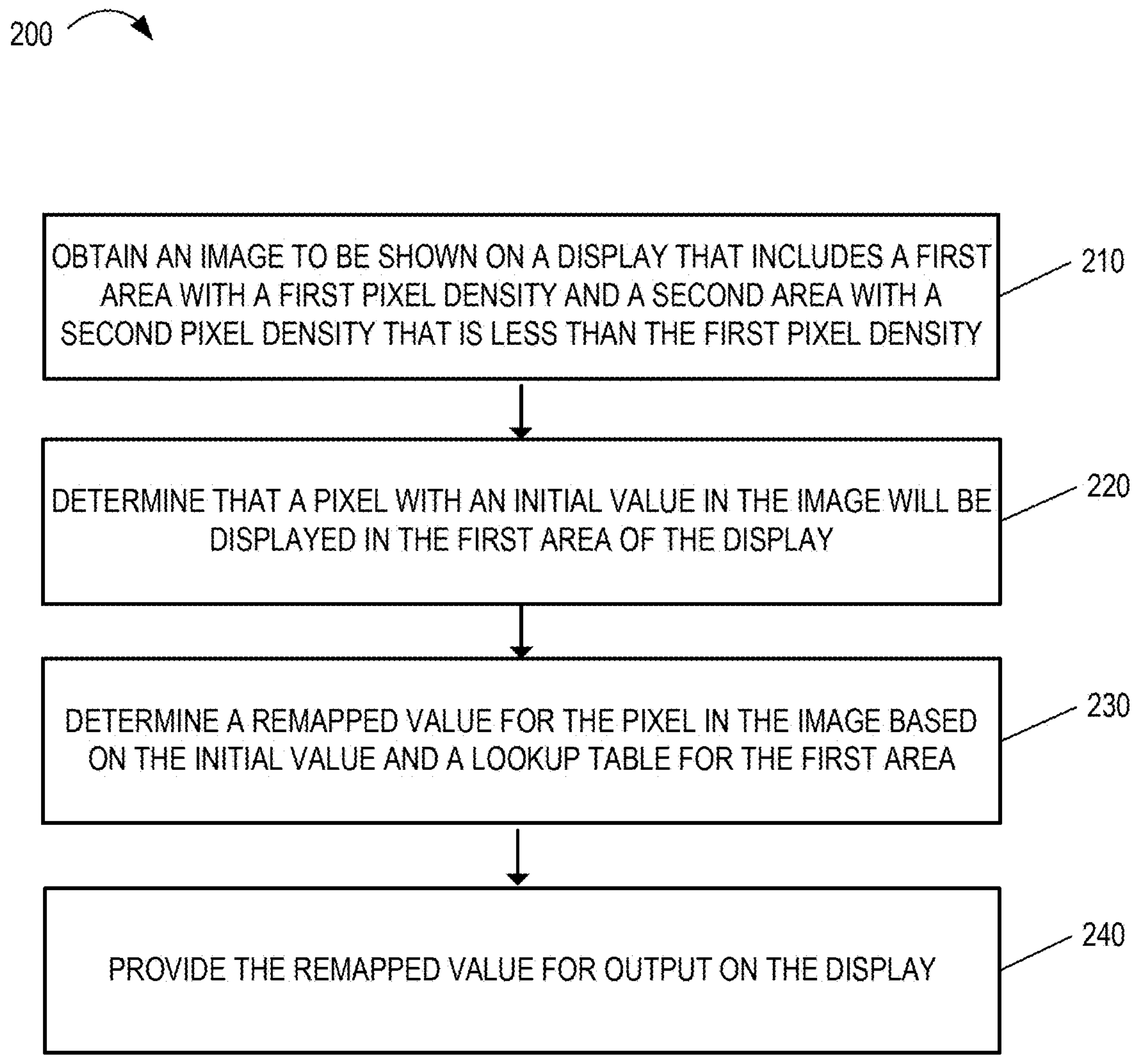
FIG. 2 is a flowchart that shows a process for dual color management for a multi-pixel density display.

FIG. 2 is a flowchart that shows a process 200 for dual color management for a multi-pixel density display. The process 200 may be performed by the system 100. The process 200 includes obtaining an image to be shown on a display, where the display includes both a first area that has a first pixel density and a second area that has a second pixel density that is less than the first pixel density (210).

For example, the system 100 may be located within a mobile computing device that includes a display, where the image includes a pixel at 1,1 with an initial RGB value of 50,50,50 that is to be shown on the display and the display includes a first area with a pixel density of four hundred pixels per square inch that surrounds a second area with a pixel density of two hundred pixels per square inch.

The process 200 includes determining that a pixel with an initial value in the image will be displayed in the first area of the display (220). For example, as shown in FIG. 1B, the pixel locator 110 may determine that the pixel at 1,1 in the image may be shown at a location of 10,10 on the display and the area determinator 120 may determine that the location of 10,10 on the display is in the first area of the display and, in response, output an area indication of first area.

In another example, as shown in FIG. 1C, the pixel locator 110 may determine that the pixel at 1,1 in the image may be shown at a location of 70,70 on the display and the area determinator 120 may determine that the location of 70,70 on the display is in the second area of the display and, in response, output an area indication of second area.

The process 200 includes determining a remapped value for the pixel in the image based on the initial value and a lookup table for the first area (230). For example, as shown in FIG. 1B, the remapper 130 may remap the initial value of 50,50,50 for the pixel to a first intermediate value of 55,65,60, and the remapped value selector 150 may select the first intermediate value as the remapped value.

In some implementations, determining a remapped value for the pixel in the image based on the initial value and a lookup table for the first area includes determining the remapped value as a combination of an output of a red table with entries of pairs of an input of RGB values and an output of a remapped red value, an output of a blue table with entries of pairs of an input of RGB values and an output of a remapped blue value, and an output of a green table with entries of pairs of an input of RGB values and an output of a remapped green value.

For example, the remapper 130 may determine the first intermediate value of 55,65,60 by providing the initial value of 50,50,50 to a red lookup table and obtaining a remapped red value of 55, providing the initial value of 50,50,50 to a green lookup table and obtaining a remapped green value of 65, and providing the initial value of 50,50,50 to a blue lookup table and obtaining a remapped blue value of 55, and then combining the remapped red value of 55, the remapped green value of 65, and the remapped blue value of 60 to obtain the first intermediate value of 55,65,60.

In some implementations, determining a remapped value for the pixel in the image based on the initial value and a lookup table for the first area includes determining a XYZ color space value from the initial value and determining a RGB color space value as the remapped value from the XYZ color space value and the lookup table for the first area.

For example, the system 100 may include a RGB color space to XYZ conversion function that is not specific to particular displays, provide the initial value to the conversion function, take the XYZ color space output of the function and use it as input to the remapper 130, and obtain the output of the remapper 130 as the first intermediate value. In this example, the lookup table may include entries with inputs that are in the XYZ color space and outputs in the RGB color space.

The process 200 includes providing the remapped value for output on the display (240). For example, the remapped value selector 150 may provide the first intermediate value of 55,65,60 that was selected to display digital integrated circuitry (DDIC) that is used to generate a driving circuit to a pixel from the value of 55,65,60.

In some implementations, providing the remapped value for output on the display includes determining a second remapped value for the pixel in the image based on the initial value and a lookup table for the second area and selecting the remapped value instead of the second remapped value based on determining that the pixel with the initial value in the image will be displayed in the first area of the display. For example, the remapper 140 may also determine a second intermediate value of 60,70,60 and the selector 150 may then select between the first intermediate value and the second intermediate value based on the area indicator.

In some implementations, the process 200 includes determining that a second pixel with the initial value in the image will be displayed in the second area of the display, in response to determining that the second pixel with the initial value in the image will be displayed in the second area of the display, determining a second remapped value for the second pixel in the image based on the initial value and a lookup table for the second area, where the second remapped value is different than the remapped value, and providing the second remapped value for output on the display.

For example, a second pixel at 80,80 in the image that also includes the first pixel may have also an initial value of 50,50,50, the area determinator 120 may determine the second pixel is in the second area, the remapper 130 may still determine a first intermediate value of 55,65,60, the remapper 140 may still determine a second intermediate value of 60,70,60, and the selector 150 may instead select the second intermediate value of 60,70,60 as the remapped value.

In some implementations, the process 200 includes determining that a second pixel with a second initial value in the image will be displayed in the first area of the display, in response to determining that a second pixel with a second initial value in the image will be displayed in the first area of the display, determining a second remapped value for the second pixel in the image based on the initial value and the lookup table for the first area, where the second remapped value is different than the remapped value, and providing the second remapped value for output on the display.

For example, a second pixel at 2,2 in the image with the first pixel may have an initial value of 30,30,30, the area determinator 120 may determine the second pixel is in the first area, the remapper 130 may determine a first intermediate value of 33,36,33, the remapper 140 may determine a second intermediate value of 35,38,34, and the selector 150 may select the first intermediate value of 33,36,33 as the remapped value.

In some implementations, the lookup table for the first area includes a table of entries, where each entry includes a pair of an initial value as an input and a remapped value as an output. For example, the lookup table for the first area may include 16,777,216 entries, with an input for each possible combination of integer values between zero and two hundred fifty five for red, green, and blue, and an output RGB value for each entry.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (erasable programmable read-only memory), EEPROM (electrically erasable programmable read-only memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) or OLED (organic light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

obtaining, by an electronic device, an image to be shown on a multi-pixel density display, with the image including a pixel that has an initial value, and where the multi-pixel density display includes both a first area that has a first pixel density and a second area that has a second pixel density that is less than the first pixel density;

determining, by the electronic device, a first intermediate remapped value for the pixel in the image based on the initial value for the pixel in the image and a lookup table that provides color management for the first area based on the first area having the first pixel density;

determining, by the electronic device, a second intermediate remapped value for the pixel in the image based on the initial value for the pixel in the image and a lookup table that provides color management for the second area based on the second area having the second pixel density;

determining, by the electronic device, that the pixel in the image will be displayed in the first area of the multi-pixel density display;

selecting, by the electronic device after having determined both the first intermediate remapped value for the pixel in the image and the second intermediate remapped value for the pixel in the image, the first intermediate remapped value for the pixel in the image instead of the second intermediate remapped value for the pixel in the image as a selected remapped value for display by the multi-pixel density display, based on determining that the pixel in the image will be displayed in the first area of the multi-pixel density display; and providing, by the electronic device, the first intermediate remapped value for the pixel in the image as the selected remapped value for output on the display.

2. The method of claim 1, wherein determining the first intermediate remapped value for the pixel in the image based on the initial value for the pixel in the image and the lookup table for the first area comprises:

determining a XYZ color space value from the initial value for the pixel in the image; and determining a RGB color space value as the first intermediate remapped value from the XYZ color space value and the lookup table for the first area.

3. The method of claim 1, comprising:

determining that a second pixel with the initial value in the image will be displayed in the second area of the display;

in response to determining that the second pixel with the initial value in the image will be displayed in the second area of the display, determining a second remapped value for the second pixel in the image based on the initial value for the second pixel in the image and the lookup table for the second area, wherein the second remapped value for the second pixel in the image is different than the first intermediate remapped value for the pixel in the image; and providing the second remapped value for the second pixel in the image for output on the display.

4. The method of claim 1, comprising:

determining that a second pixel with a second initial value in the image will be displayed in the first area of the display;

in response to determining that the second pixel with the second initial value in the image will be displayed in the first area of the display, determining a second remapped value for the second pixel in the image based on the second initial value and the lookup table for the first area, wherein the second remapped value for the second pixel in the image is different than the first intermediate remapped value for the pixel in the image; and providing the second remapped value for the second pixel in the image for output on the display.

5. The method of claim 1, wherein the lookup table for the first area comprises:

a table of entries, wherein each entry includes a pair of an initial value as an input and a remapped value as an output.

6. The method of claim 1, wherein selecting the first intermediate remapped value for the pixel is performed by a remapped value selector that:

(i) receives the first intermediate remapped value;

(ii) receives the second intermediate remapped value; and (iii) receives an indication that the pixel is to be presented in first area of the display.

7. The method of claim 1, wherein the electronic device performs in parallel:

(i) the determining the first intermediate remapped value for the pixel in the image;

(ii) the determining the second intermediate remapped value for the pixel in the image; and (iii) the determining that the pixel in the image will be displayed in the first area of the multi-pixel density display.

8. A system that includes circuitry configured to perform operations of:

obtaining, by an electronic device, an image to be shown on a multi-pixel density display, with the image including a pixel that has an initial value, and where the multi-pixel density display includes both a first area that has a first pixel density and a second area that has a second pixel density that is less than the first pixel density;

determining, by the electronic device, a first intermediate remapped value for the pixel in the image based on the initial value for the pixel in the image and a lookup table that provides color management for the first area based on the first area having the first pixel density;

determining, by the electronic device, a second intermediate remapped value for the pixel in the image based on the initial value for the pixel in the image and a lookup table that provides color management for the second area based on the second area having the second pixel density;

determining, by the electronic device, that the pixel in the image will be displayed in the first area of the multi-pixel density display;

selecting, by the electronic device after having determined both the first intermediate remapped value for the pixel in the image and the second intermediate remapped value for the pixel in the image, the first intermediate remapped value for the pixel in the image instead of the second intermediate remapped value for the pixel in the image as a selected remapped value for display by the multi-pixel density display, based on determining that the pixel in the image will be displayed in the first area of the multi-pixel density display; and providing, by the electronic device, the first intermediate remapped value for the pixel in the image as the selected remapped value for output on the display.

9. The system of claim 8, wherein determining the first intermediate remapped value for the pixel in the image based on the initial value for the pixel in the image and the lookup table for the first area comprises:

determining a XYZ color space value from the initial value for the pixel in the image; and determining a RGB color space value as the first intermediate remapped value from the XYZ color space value and the lookup table for the first area.

10. The system of claim 8, the operations comprising:

determining that a second pixel with the initial value in the image will be displayed in the second area of the display;

in response to determining that the second pixel with the initial value in the image will be displayed in the second area of the display, determining a second remapped value for the second pixel in the image based on the initial value for the second pixel in the image and the lookup table for the second area, wherein the second remapped value for the second pixel in the image is different than the first intermediate remapped value for the pixel in the image; and providing the second remapped value for the second pixel in the image for output on the display.

11. The system of claim 8, the operations comprising:

determining that a second pixel with a second initial value in the image will be displayed in the first area of the display;

in response to determining that the second pixel with the second initial value in the image will be displayed in the first area of the display, determining a second remapped value for the second pixel in the image based on the second initial value and the lookup table for the first area, wherein the second remapped value for the second pixel in the image is different than the first intermediate remapped value for the pixel in the image; and providing the second remapped value for the second pixel in the image for output on the display.

12. The system of claim 8, wherein the lookup table for the first area comprises:

a table of entries, wherein each entry includes a pair of an initial value as an input and a remapped value as an output.

13. A non-transitory computer-readable medium storing software comprising instructions executable by one or more computers which, upon such execution, cause the one or more computers to perform operations comprising:

obtaining, by an electronic device, an image to be shown on a multi-pixel density display, with the image including a pixel that has an initial value, and where the multi-pixel density display includes both a first area that has a first pixel density and a second area that has a second pixel density that is less than the first pixel density;

determining, by the electronic device, a first intermediate remapped value for the pixel in the image based on the initial value for the pixel in the image and a lookup table that provides color management for the first area based on the first area having the first pixel density;

determining, by the electronic device, a second intermediate remapped value for the pixel in the image based on the initial value for the pixel in the image and a lookup table that provides color management for the second area based on the second area having the second pixel density;

determining, by the electronic device, that the pixel in the image will be displayed in the first area of the multi-pixel density display;

selecting, by the electronic device after having determined both the first intermediate remapped value for the pixel in the image and the second intermediate remapped value for the pixel in the image, the first intermediate remapped value for the pixel in the image instead of the second intermediate remapped value for the pixel in the image as a selected remapped value for display by the multi-pixel density display, based on determining that the pixel in the image will be displayed in the first area of the multi-pixel density display; and providing, by the electronic device, the first intermediate remapped value for the pixel in the image as the selected remapped value for output on the display.

14. The medium of claim 13, wherein determining the first intermediate remapped value for the pixel in the image based on the initial value for the pixel in the image and the lookup table for the first area comprises:

determining a XYZ color space value from the initial value for the pixel in the image; and determining a RGB color space value as the first intermediate remapped value from the XYZ color space value and the lookup table for the first area.

15. The medium of claim 13, the operations comprising:

determining that a second pixel with the initial value in the image will be displayed in the second area of the display;

in response to determining that the second pixel with the initial value in the image will be displayed in the second area of the display, determining a second remapped value for the second pixel in the image based on the initial value for the second pixel in the image and the lookup table for the second area, wherein the second remapped value for the second pixel in the image is different than the first intermediate remapped value for the pixel in the image; and providing the second remapped value for the second pixel in the image for output on the display.

16. The medium of claim 13, the operations comprising:

determining that a second pixel with a second initial value in the image will be displayed in the first area of the display;

in response to determining that the second pixel with the second initial value in the image will be displayed in the first area of the display, determining a second remapped value for the second pixel in the image based on the second initial value and the lookup table for the first area, wherein the second intermediate remapped value for the second pixel in the image is different than the first remapped value for the pixel in the image; and providing the second remapped value for the second pixel in the image for output on the display.

* * * * *